United States Patent [19]

Waddoups

[11] 4,111,050
[45] Sep. 5, 1978

[54] THERMOMETER WITH BIREFRINGENT SENSING ELEMENT IN FIBER OPTIC COUPLING

[75] Inventor: Ray O. Waddoups, Valencia, Calif.

[73] Assignee: International Telephone and Telegraph Corporation, New York, N.Y.

[21] Appl. No.: 815,689

[22] Filed: Jul. 14, 1977

[51] Int. Cl.² .................................................. G01K 11/14
[52] U.S. Cl. .................................... 73/362 R; 73/356; 356/114
[58] Field of Search .................... 73/356, 357, 362 R; 350/147; 356/114

[56] References Cited

U.S. PATENT DOCUMENTS

| | | | |
|---|---|---|---|
| 3,950,987 | 4/1976 | Slezinger et al. | 73/362 R X |
| 3,960,017 | 6/1976 | Romanowski | 73/362 R X |
| 4,016,761 | 4/1977 | Rozzell et al. | 73/356 |

*Primary Examiner*—Charles Gorenstein
*Attorney, Agent, or Firm*—William T. O'Neil

[57] ABSTRACT

A thermometer arrangement in which the active element is a block of birefringent material between two optical planar polarizers. Light energy from a source is conducted through a fiber optic light conductor through the input polarizer, the birefringent element, the output polarizer, and via a second fiber optic light conductor, into a light-to-electrical transducer. Polarization plane rotation effected by the birefringent element in combination with the fixed polarizers effectively modulates the light intensity from an arbitrary level (such as substantially zero at some selected temperature) so that the transducer output signal is a function of temperature. A reference accounting for light source variations, etc. is provided by a separate fiber optic conductor, a second transducer, and a differential detector. Linearizing means are also shown.

12 Claims, 1 Drawing Figure

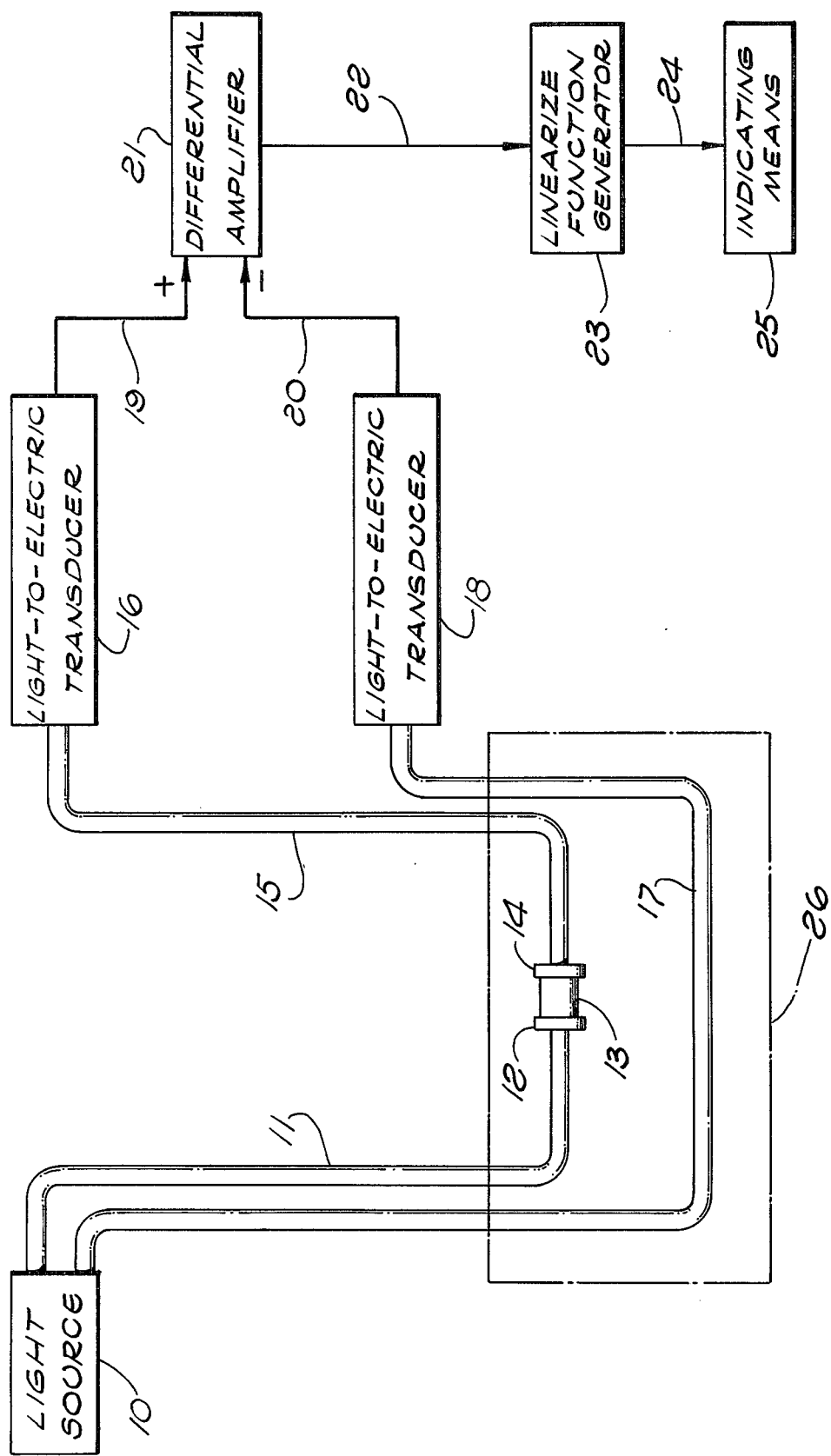

THERMOMETER WITH BIREFRINGENT SENSING ELEMENT IN FIBER OPTIC COUPLING

BACKGROUND OF THE INVENTION

1. Field of the Invention

The invention relates generally to temperature measuring devices and, more particularly, to such devices for remote measurement in a fluid environment.

2. Description of the Prior Art

The state of the art in temperature measurement covers a wide range of techniques, ranging from the many thermometer species which are based on expansion and contraction of a solid or fluid material, to optical pyrometers for determining the temperatures of molten metals by their radiation color. In between, are such devices as the thermocouple and electrical resistance-measuring devices, to mention a few. Wherever temperatures must be measured in corrosive or radio-active environments, it is essential that remote indication be provided from the point of actual measurement. It is also essential in such cases that the temperature-sensing element used by relatively immune to the environmental conditions, and also that it not be electrically conductive in many applications.

In electrolytic processing such as in electro-plating, for example, the high levels of current passing through the electrolyte make the use of any electrical conductor between the point of indication and the sensing element difficult. Moreover, magnetic fields therein can have inductive effects wherever electrically conductive connections are involved in the temperature instrumentation within the electrolytic fluid.

The manner in which the present invention uniquely exploits known physical principles to produce a new combinations of elements greatly superior to the prior art techniques will be evident as this description proceeds.

SUMMARY

It may be said to have been the general objective of the present invention to provide a temperature-measuring apparatus suitable for use in corrosive, radioactive and electrolyting processing environments and which is adapted for temperature indication remotely.

The combination of the present invention makes use of fiber optic technology in that a light energy signal from a suitable source is conveyed in an optical fiber conductor to a sensing element and also from the sensing element to an indicator in a remote location, the sensing element being within the environment to be measured. Basically, light intensity values are measured, these being determined in accordance with the temperature independent light transmissability of the sensing element. The sensing element itself, comprises a birefringent element between a pair of polarizers, the input polarizer being oriented to provide polarization at 45° with respect to the ordinary and extraordinary axes of the birefringent material. An output polarizer may be rotated to provide some arbitrary light transmission through the sensor assembly. This arbitrary level may be substantially zero.

The details of instrumentation of a typical embodiment according to the invention will be understood as this description proceeds.

BRIEF DESCRIPTION OF THE DRAWING

A single drawing FIGURE depicting a schematic block diagram of a temperature-measuring device according to the invention is shown.

DESCRIPTION OF THE PREFERRED EMBODIMENT

Referring now to the FIGURE, the sensing element comprises the birefringent block 13 of calcite, or some other birefringent material, having an input plane polarizer 12 and a similar output polarizer 14. Light energy is conveyed by a fiber optic conductor 11 from the light source 10, which may be a light-emitting diode, a laser source, or other light-developing means. The actual selection will depend upon the length of the fiber optic conductors between the light source and sensor, and between the sensor and the light-to-electric transducers as well as other design considerations.

It is known that birefringent materials are capable of rotating the polarization of plane-polarized light applied thereto. This rotation of the plane of polarization can be effected variously (such as electrically), but it is also known to be a function of temperature.

It is known in the art to speak of ordinary and extraordinary axes of polarization of birefringent material, and it is known that applied light polarized in one dimension travels slower than in the orthogonal dimension in such materials. As a function of temperature, this speed of light propagation changes differently in the ordinary versus the extraordinary axis of the birefringent material. In the combination of the present invention, it is preferred that the applied light energy at the input side of element 13 be polarized 45° with respect to the two (ordinary and extraordinary) axes of the birefringent material.

From the foregoing, it will be evident that the polarization of light passing through the birefringent element exhibits some predetermined plane polarization as a function of the temperature of 13 at any time. The polarizer 14 may then be positioned in order to provide some predetermined amount of light amplitude passing into the fiber optic conductor 15 at a selected (reference) temperature. For example, the rotation of polarizer 14 might be such as to produce substantially a zero overall light transmission at the selected or predetermined reference temperature. Variations of light due to changes in the temperature will then produce an increasing light transmission through 15.

Before discussing the instrumentation further, it is noted that the properties of birefringent materials are extensively documented in the technical literature. Their use in the so-called Lyot filters, which are actually optical bandpass filters, has been suggested in an article entitled, *Improvement of Birefringent Filters*, by Dr. Alan M. Title, published in the periodical APPLIED OPTICS, Volume 14, No. 1 (January, 1975). That technical paper provides a useful background in respect to understanding of the nature and operation of birefringent elements, although it does not relate to temperature measurement specifically.

Both the polarizer elements 12 and 14 may be of the thin film "polaroid" type.

Returning now to the FIGURE, it will be noted that the fiber optic light conductor 15 is connected to a light-to-electric transducer 16 comprising a photodiode or similar device, the output signal on lead 19 thereby being provided as an electrical analog signal which is a function of a temperature within the environment typically defined by the dotted-line block 26. As previously indicated, this environment might be any one of a number of media, such as an electrolytic bath or gaseous atmosphere, and can actually be solid or granular material as well.

It will be noted that an additional fiber optic conductor 17 is provided between light source 10 and a second light-to-electric transducer 18. The purpose of this additional conductor, which is arranged to receive as nearly the same level of input light as is applied to 11, is to permit compensation for changes in light intensity from 10 and for other nontemperature-related environmental effects.

The light-to-electronic transducers 16 and 18 are substantially identical, the output 20 of 18 being a signal representative only of the nontemperature-related factors aforementioned. A differential amplifier 21 provides means for cancelling such errors by essentially re-referencing the signal on 19 in accordance with these extraneous variations. The element 21 may be of well known type having inverting and noninverting inputs (+ and −) and need not necessarily provide gain in excess of unity. Thus, the signal on 22 is a function substantially only of the temperature-induced polarization rotation effects in 13 as aforementioned.

While the signal 22 is now understood to be a function of the temperature within the environment 26, it is clearly not a linear function thereof. Quite obviously, indicating devices with nonlinear scales can adequately present such nonlinear analog relationships, however, the linearizing function generator 23 is shown to illustrate that the analog signal on 22 can effectively be linearized such that at 24 a signal which is a linear direct (or inverse) function of temperature is provided to a standard indication device 25. The device 25 may be of essentially any known type with a suitable scale.

If a digital-type voltmeter is selected to provide the indicating function at 25, it is relatively easy to incorporate the linearizing function of 23 therein. The manner of instrumenting such devices as "mini-computers" is well understood in the electronic arts and need not be further discussed here.

The "reference" fiber optic light conductor 17 is shown exposed to the same environment as the birefringent element 13, however, it will be realized this is not necessary if only the major source of error (namely, the variation of amplitude of light source 10) is of concern. Furthermore, the length of the reference fiber optic conductor is then arbitrary and can be much shorter, relatively, placing the indicating means close to the light source, physically.

Various other modifications and variations in the structure of the device of the FIGURE will suggest themselves to those skilled in this art. For one example, the two light-to-electric transducers 16 and 18 might be combined in one transducer commutated between the fiber optic conductors 15 and 17. Such a variation obviously would require "shuttering", or the equivalent, to provide a light "chopping" effect. If the differential amplifier were similarly commutated or, if integration were introduced in respect to the signal into 21, the same compensation effect could be obtained in respect to the signal on 22 as hereinabove set forth.

Quite obviously, the device is operable from a nominal low temperature zero point upwards in temperature or, conversely, it may be operated from a relatively high arbitrary "zero" level and thence downward in temperature therefrom.

Since no electrical conduction is afforded by any of the fiber optic conductors associated with the environment in 26, there are no electromagnetic or electrostatic pickup problems. Moreover, since these fiber optic conductors are insulators of high quality (very high resistivity) operation over a large voltage gradient or common mode voltage is easily accomplished. Quite obviously, too, the relative immunity of glass fibers to corrosive influences is an important matter in some applications.

Protection of the calcite or other birefringent element 13 against chemical or other attach may be afforded by some degree of encapsulation of the element 13 itself or the element 13 together with polarizers 12 and 14, if necessary.

Although the mineral calcite is a relatively inexpensive and effective birefringent material, there are other materials, especially birefringent plastic materials, known in in the art and which are capable of performing satisfactorily in the device of the invention.

Still other variations in this specific structure will suggest themselves to those skilled in this art, and accordingly, it is not intended that the scope of the invention should be limited by the drawing or this description, these being typical and illustrative only.

What is claimed is:

1. A temperature-measuring device comprising:
 a light source;
 first and second fiber optic light conductors, said first light conductor being arranged to receive light energy from said light source at a first end thereof;
 a birefringent optical element having a refractive index which is variable to produce a correspondingly variable polarization plane rotation as a function of temperature with input and output polarizers arranged to receive light energy from the second end of said first light conductor through said input polarizer, said birefringent element being in thermal contact with the environment, the temperature of which is to be measured, said polarizers being oriented to provide a predetermined relatively low value of light transmission into said second fiber optic conductor corresponding to a predetermined temperature;
 and a light-to-electric transducer arranged to receive light energy from the second end of said second fiber optic light conductor to provide a first electrical signal, the magnitude of which is a function of the temperature of said environment.

2. Apparatus according to claim 1 in which said light source in a laser device generating a visible light output.

3. Apparatus according to claim 1 in which said light source is a light-emitting diode.

4. According to claim 1 in which said birefringent optical element is a calcite block.

5. Apparatus according to claim 1 in which a third fiber optic light conductor is included and is connected at its first end to said light source; and including a second light-to-electric transducer arranged to receive light energy from the second end of said third light conductor to provide a second electrical signal as a reference, and means for modifying said first electrical signal in accordance with variations in said signal to compensate said first signal as a function of selected factors other than the light polarization change effected by said birefringent element.

6. Apparatus according to claim 4 in which a third fiber optic light conductor is included and is connected at its first end to said light source; and including a second light-to-electric transducer arranged to receive light energy from the second end of said third light conductor to provide a second electrical signal as a reference, and means for modifying said first electrical signal in accordance with variations in said second signal to compensate said first signal as a function of selected factors other than the light polarization change effected by said birefringent element.

7. Apparatus according to claim 1 in which a linearizing function generator responsive to said first electrical signal is provided to produce a modified electrical signal which varies linearly as a function of said temperature of said environment.

8. Apparatus according to claim 4 in which a linearizing function generator responsive to said first electrical signal is provided to produce a modified electrical signal which varies linearly as a function of said temperature of said environment.

9. Apparatus according to claim 5 in which a linearizing function generator responsive to said first electrical signal is provided to produce a third electrical signal which varies linearly as a function of said temperature of said environment.

10. Apparatus according to claim 1 in which said input and output polarizers are fixed in a predetermined rotational relative relationship such that the total light transmission through said polarizers and said birefringent element is a predetermined value at a corresponding predetermined temperature.

11. Apparatus according to claim 10 in which said polarizers are arranged such that said predetermined value of light transmission is substantially zero.

12. Apparatus according to claim 4 in which said input and output polarizers are fixed in a predetermined rotational relative relationship such that the total light transmission through said polarizers and said birefringent element is a predetermined value at a corresponding predetermined temperature.

* * * * *